United States Patent
Tanaka et al.

(10) Patent No.: US 9,586,359 B2
(45) Date of Patent: *Mar. 7, 2017

(54) BLOW MOLDING DEVICE AND BLOW MOLDING METHOD

(71) Applicant: Discma AG, Hunenberg (CH)

(72) Inventors: Toshimasa Tanaka, Tokyo (JP); Shinichi Tabata, Tokyo (JP)

(73) Assignee: DISCMA AG, Hunenberg (CH)

( * ) Notice: Subject to any disclaimer, the term of this patent is extended or adjusted under 35 U.S.C. 154(b) by 156 days.

This patent is subject to a terminal disclaimer.

(21) Appl. No.: 14/368,999

(22) PCT Filed: Dec. 10, 2012

(86) PCT No.: PCT/JP2012/007871
§ 371 (c)(1),
(2) Date: Jun. 26, 2014

(87) PCT Pub. No.: WO2013/099120
PCT Pub. Date: Jul. 4, 2013

(65) Prior Publication Data
US 2014/0374965 A1     Dec. 25, 2014

(30) Foreign Application Priority Data

Dec. 26, 2011 (JP) ................................ 2011-284231
Mar. 30, 2012 (JP) ................................ 2012-082254

(51) Int. Cl.
*B29C 49/32* (2006.01)
*B29C 49/14* (2006.01)
(Continued)

(52) U.S. Cl.
CPC ............. *B29C 49/32* (2013.01); *B29C 49/14* (2013.01); *B29C 49/06* (2013.01); *B29C 49/541* (2013.01); *B29L 2031/7158* (2013.01)

(58) Field of Classification Search
None
See application file for complete search history.

(56) References Cited

U.S. PATENT DOCUMENTS

| 7,833,466 B2* | 11/2010 | Hirota | .................. B65D 1/0223 264/521 |
| 8,968,636 B2* | 3/2015 | Eberle | ................. B29C 49/0073 264/523 |
| 2012/0091635 A1* | 4/2012 | Eberle | ................. B29C 49/0073 264/532 |

FOREIGN PATENT DOCUMENTS

| JP | H04131222 A | 5/1992 |
| JP | A-8-39656 | 2/1996 |

(Continued)

OTHER PUBLICATIONS

Mar. 19, 2013 International Search Report issued in International Application No. PCT/JP2012/007871.

(Continued)

*Primary Examiner* — Monica Huson
(74) *Attorney, Agent, or Firm* — Eric J. Sosenko; Jonathan P. O'Brien; Honigman Miller Schwartz and Cohn LLP

(57) ABSTRACT

To prevent core misalignment when performs are stretched during blow molding, provided is a blow molding device that blow molds a preform into a container in a forming mold. The blow molding device includes a support pin that is disposed in the forming mold. The support pin includes a head that supports a bottom portion of the preform, and a shaft that is connected to the head and that is displaceable upward and downward in a direction of an axis of the preform. The head is provided, at one end thereof supporting the bottom portion of the preform, with a concave portion for receiving at least a part of the bottom portion.

18 Claims, 9 Drawing Sheets

(51) Int. Cl.
　　　*B29C 49/06*　　　　(2006.01)
　　　*B29C 49/54*　　　　(2006.01)
　　　*B29L 31/00*　　　　(2006.01)

(56) References Cited

FOREIGN PATENT DOCUMENTS

| JP | H09123260 A | 5/1997 |
| JP | A-10-71641 | 3/1998 |
| JP | 2002067131 A | 3/2002 |
| JP | A-2004-122457 | 4/2004 |
| JP | A-2007-290772 | 11/2007 |

OTHER PUBLICATIONS

Mar. 19, 2013 Written Opinion of the International Searching Authority issued in Internatinoal Application No. PCT/JP2012/007871.

\* cited by examiner

BLOW MOLDING DEVICE AND BLOW MOLDING METHOD

TECHNICAL FIELD

The present invention relates to a blow molding device and a blow molding method for blow molding a preform into a container.

BACKGROUND ART

Examples of conventional blow molding devices include the one including a metal mold, a stretching rod that stretches a preform from within, and a support pin that supports a bottom portion of the preform from outside of the preform, wherein a tip of the support pin has a convex shape. (Refer to Patent Literature 1, for example.)

CITATION LIST

Patent Literature

PTL 1: JP2004122457A

SUMMARY OF THE INVENTION

Technical Problems

However, in the aforementioned conventional blow molding device, the tip of the support pin has the convex shape. Accordingly, it is not possible to stably support the bottom portion of the preform solely by the support pin, possibly resulting in core misalignment during blowing of the preform.

The present invention is to provide a blow molding device and a blow molding method both of which are capable of preventing core misalignment during blowing of the preform.

Solution to Problems

A first aspect of the present invention resides in a blow molding device that blow molds a preform into a container in a forming mold, the preform having a bottomed tubular shape. The blow molding device includes a support pin that is disposed in the forming mold. The support pin includes a head that supports a bottom portion of the preform, and a shaft that is connected to the head and that is displaceable upward and downward in an axis direction of the preform. The head is provided, at one end thereof supporting the bottom portion of the preform, with a concave portion for receiving at least a part of the bottom portion of the preform.

In the blow molding device according to the first aspect of the present invention, preferably, the head includes an inclined surface formed outward of the concave portion, the inclined surface flaring toward another end of the head.

In the blow molding device according to the first aspect of the present invention, preferably, a maximum diameter of the head is greater than a diameter of the shaft.

In the blow molding device according to the first aspect of the present invention, preferably, the one end of the head is formed as a flat surface.

In the blow molding device according to the first aspect of the present invention, preferably, the support pin is configured to support the bottom portion of the preform in an upwardly displaced position of the support pin and is configured to be displaced downward in accordance with deformation of the preform as a result of blow molding.

The blow molding device according to the first aspect of the present invention preferably further includes a resistance applying means that applies resistance to the preform when the support pin is displaced downward.

In the blow molding device according to the first aspect of the present invention, preferably, the concave portion has a surface that is provided with a protrusion oriented toward a center axis line of the support pin. In the above case, the protrusion may extend upward toward the center axis line. Alternatively, the protrusion may extend in a radial direction. The protrusion may also be provided in plurality, and the plurality of protrusions may be arranged at an interval around the center axis line.

A second aspect of the present invention resides in a blow molding method for blow molding a preform into a container in a forming mold, the preform having a bottomed tubular shape. The blow molding method including the steps of: disposing a support pin in the forming mold, the support pin being displaceable upward and downward in an axis direction of the preform; receiving at least a part of a bottom portion of the preform in a concave portion that is provided at one end of a head of the support pin; and supporting the bottom portion of the preform in an upwardly displaced position of the support pin and displacing the support pin downward in accordance with deformation of the preform as a result of blow molding.

In the blow molding method according to the second aspect of the present invention, preferably, the head of the support pin includes an inclined surface formed outward of the concave portion, the inclined surface flaring toward another end of the head.

In the blow molding method according to the second aspect of the present invention, preferably, a maximum diameter of the head of the support pin is greater than a diameter of a shaft that is connected to the head.

In the blow molding method according to the second aspect of the present invention, preferably, the one end of the head of the support pin is formed as a flat surface.

In the blow molding method according to the second aspect of the present invention, preferably, the concave portion provided in the support pin has a surface that is provided with a protrusion oriented toward a center axis line of the support pin. In the above case, the protrusion may adopt any of the aforementioned shapes and arrangements.

The blow molding method according to the second aspect of the present invention preferably further includes the step of displacing the support pin downward while resistance is applied to the preform during blow molding.

Advantageous Effects of Invention

According to the present invention, by providing the head of the support pin with the concave portion for receiving the bottom portion of the preform, core misalignment during blowing of the preform is prevented. Furthermore, by providing the surface of the concave portion with a protrusion oriented toward the center axis line of the support pin, core misalignment is more effectively prevented. Moreover, according to the blow molding device of the present invention, by forming the inclined surface having an umbrella shape and flaring toward the end outward of the concave portion of the head, resin of the preform is prevented from flowing around a side surface of the support pin, and occurrence of molding defects such as variation in thickness (thickness deviation), breakage, and crease at the bottom portion of the container are prevented.

DESCRIPTION OF EMBODIMENTS

The following describes various embodiments of the present invention in detail with reference to the drawings. Although in the following embodiments a blow molding device according to the present invention is described as a blow molding device for molding a container (a bottle) for beverage, the technical scope of the present invention is not limited to molding of, a beverage container, and for example, a cosmetic container, a medicinal container, and other containers may also be molded.

Figure 1:
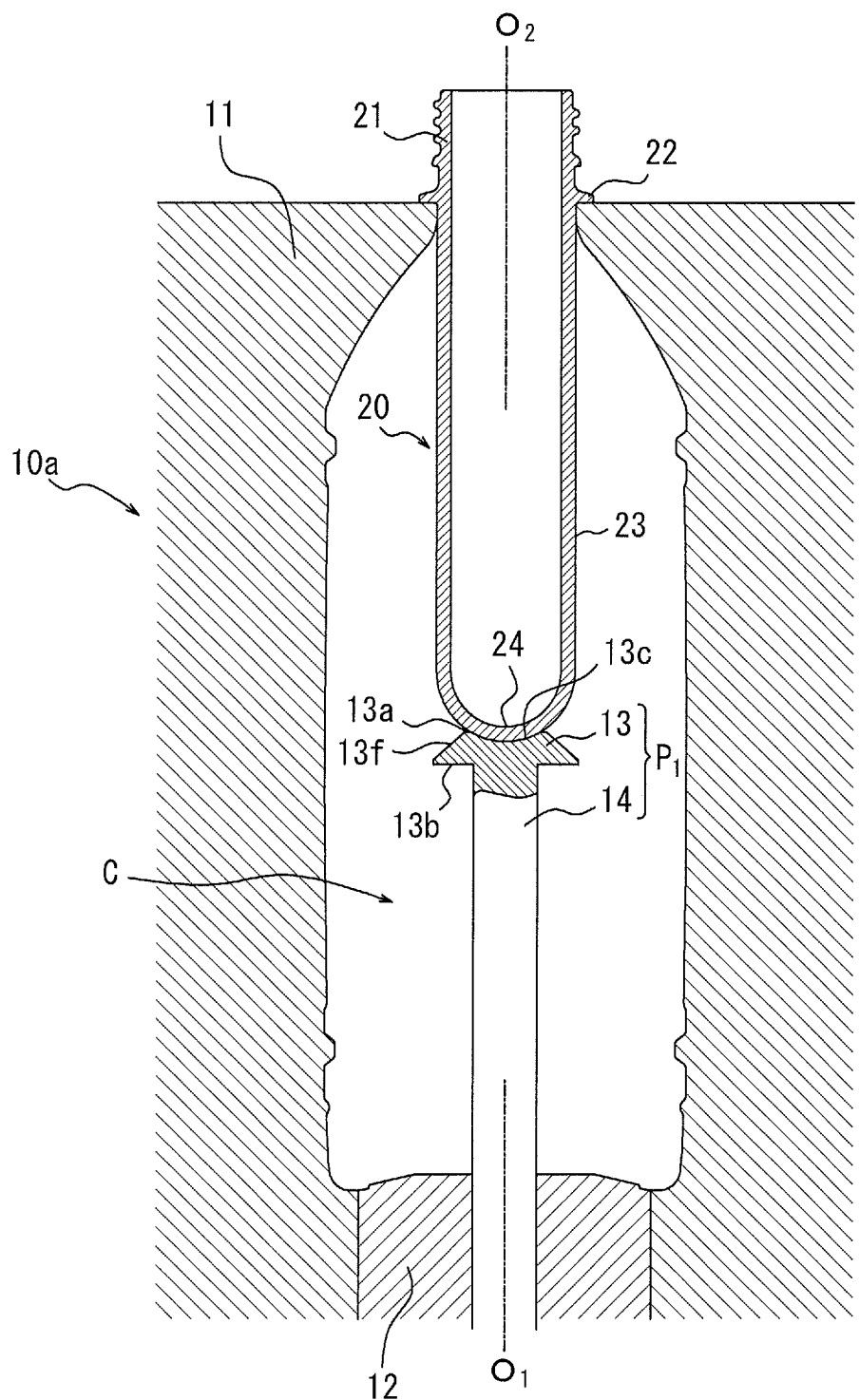
FIG. 1 is a sectional view schematically illustrating a state where a preform is subjected to mold closing in a blow molding device according to a first embodiment of the present invention.
Figure 2:
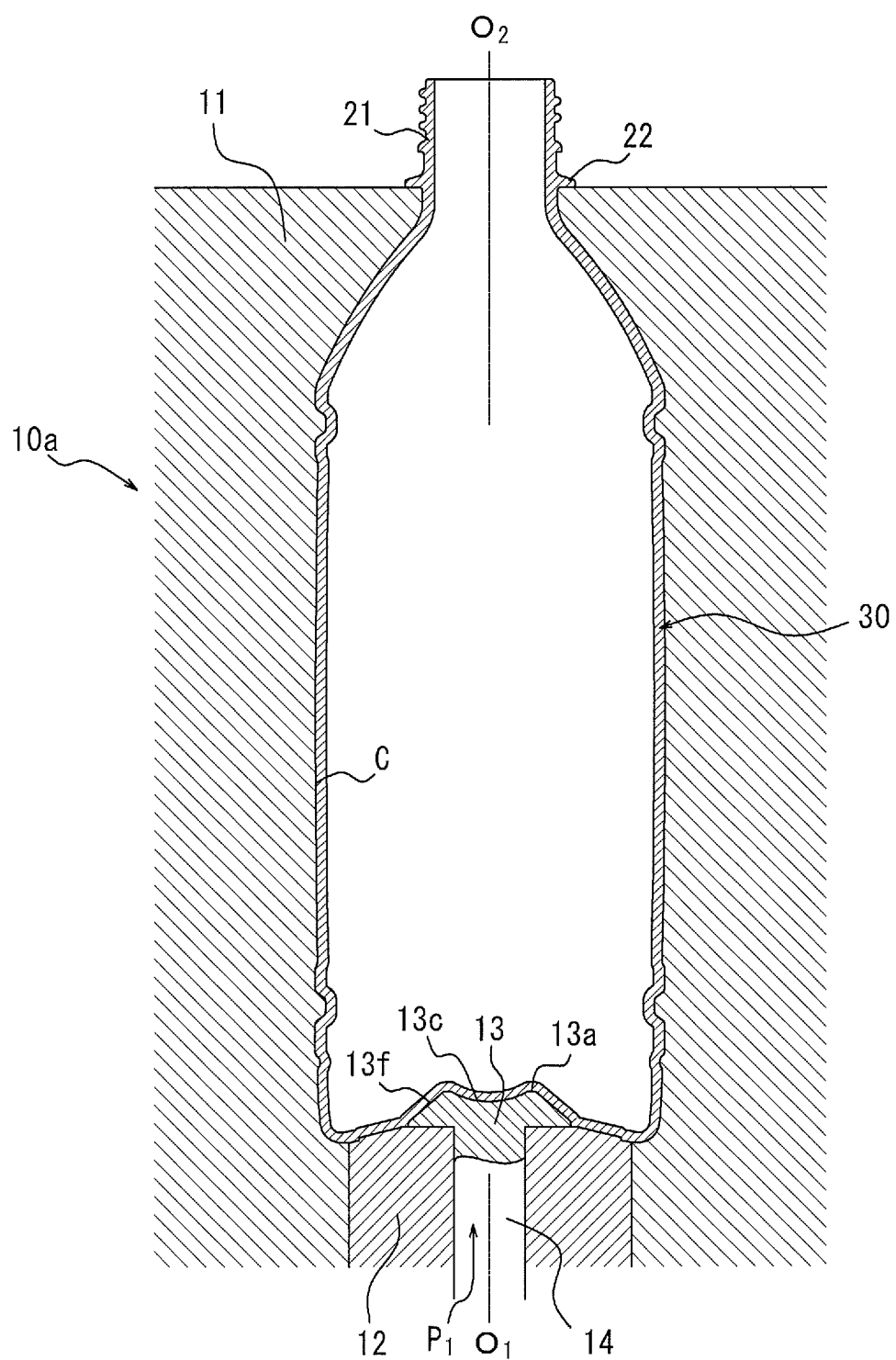
FIG. 2 is a sectional view schematically illustrating a state where blow molding with use of a preform is completed according to the first embodiment.

FIGS. 1 and 2 illustrate a blow molding device that molds a bottle container 30 by stretching a preform 20 by blow molding according to a first embodiment. FIG. 1 illustrates a state where the preform 20 preformed in a bottomed tubular shape (a test tube shape) is subjected to mold closing in a blow molding device 10a according to the first embodiment. FIG. 2 illustrates a state where, from the state illustrated in FIG. 1, fluid (which is referred to below as "blow fluid") such as high-pressure air and liquid is blown through a mouth portion 21 of the preform 20, so that the bottle container 30 is blow molded.

As illustrated in FIG. 1, as blow forming molds used for blow molding, the blow molding device 10a includes a main body's split metal mold 11 and a bottom portion's metal mold 12. The blow molding device 10a also includes a support pin $P_1$ that forms a cavity C inside the metal molds 11 and 12 together with the metal molds 11 and 12. In the blow molding device 10a, the preform 20 is disposed. The preform 20 includes the mouth portion 21, a tubular-shaped trunk portion 23, and a dome-shaped bottom portion 24. The mouth portion 21 is integrally coupled to the trunk portion 23 via a neck ring 22 below the mouth portion 21. The trunk portion 23 is closed by the dome-shaped bottom portion 24. In the preform 20, an upper end of the trunk portion 23 is sandwiched by the main body's split metal mold 11, and the preform 20 is positioned in the cavity C by means of the neck ring 22.

The support pin $P_1$ is disposed in the middle of the bottom portion's metal mold 12. The support pin $P_1$ includes a head 13 that supports the bottom portion 24 of the preform 20 from outside of the preform 20, and a shaft 14 that is connected to the head 13. The shaft 14 passes through the bottom portion's metal mold 12 and is disposed along a direction of a center axis line $O_2$ of the preform 20 such that the shaft 14 is displaceable upward and downward. In the present embodiment, a center axis line $O_1$ of the support pin $P_1$ is in alignment with a center axis line of the cavity C (the bottle container 30).

As illustrated in FIG. 1, the head 13 supports the bottom portion 24 of the preform 20 on a side of one upper end (which is referred to below as an "upper end") 13a. The upper end 13a is provided with the concave portion 13c having a shape that corresponds to the bottom portion 24 of the preform 20. As illustrated in the figure, the concave portion 13c receives at least a part of the bottom portion 24 of the preform 20. The concave portion 13c also forms a round-shaped opening portion inward of the upper end 13c. Accordingly, the upper end 13a is formed as a flat annular surface that rims the concave portion 13c. The head 13 also includes an inclined surface 13f formed radially outward of the concave portion 13c of the head 13. The inclined surface 13f has an umbrella shape and flares toward another end on a lower side (which is referred to below as a "lower end") 13b.

Figure 3:
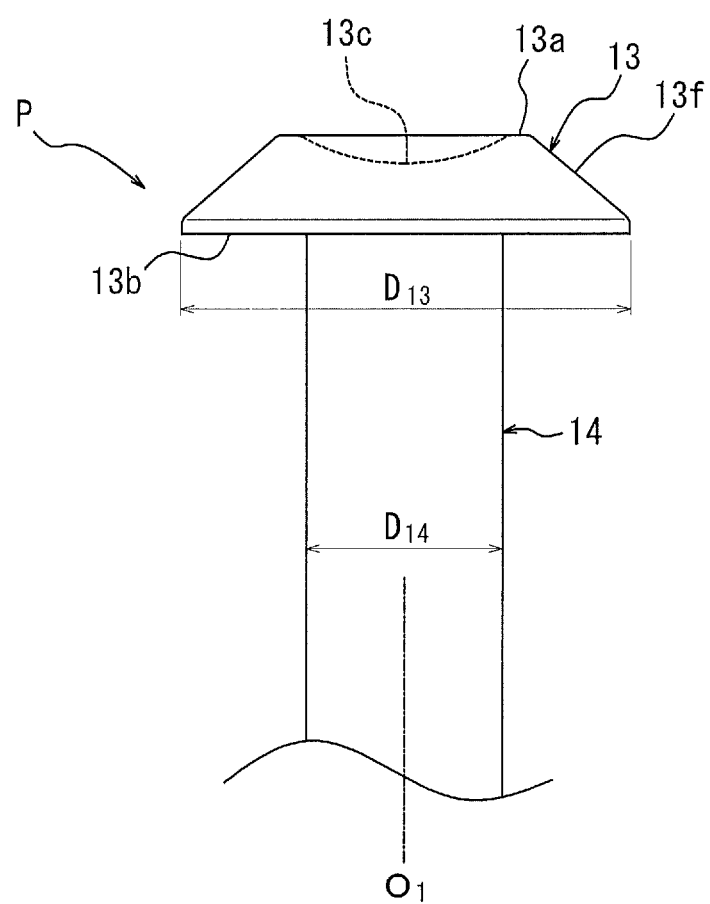
FIG. 3 is an enlarged side view of a part of a support pin according to the first embodiment.

Now, with reference to FIGS. 1-3, a description is given of a method for blow molding the bottle container 30 with use of the blow molding device 10a according to the present invention.

As illustrated in FIG. 1, first of all, the preform 20, after heated and softened, is subjected to mold closing in a metal mold. As a result, the trunk portion 23 of the preform 20 is accommodated in the cavity C. As illustrated in the figure, the trunk portion 23 accommodated in the cavity C is supported by the support pin $P_1$ in an upwardly displaced position. At this time, the bottom portion 24 in a melted condition is received by the concave portion 13c to be held. Consequently, in the cavity C, the center axis line $O_2$ of the preform 20 is brought into alignment with the center axis line $O_1$ of the support pin $P_1$, and accordingly, axis (core) misalignment of the preform 20 is prevented.

Although FIG. 1 illustrates a state where the support pin $P_1$ has been displaced upward relative to the preform 20 in advance at the timing before the start of blowing and where the preform 20 is held in the upwardly displaced position, it is also possible to form a gap between the support pin $P_1$ and the preform 20 by displacing the support pin $P_1$ downward at the timing before the start of blowing, and subsequently, to support the bottom portion 24 of the preform 20 at the timing of a molding process (during stretching) after the start of blowing.

Subsequently, from the state illustrated in FIG. 1, the blow fluid such as high-pressure air and liquid is injected (blown) into the preform 20 through the mouth portion 21 of the preform 20. At this time, with an increase in pressure inside the preform 20 (stretching of the preform 20), the support pin $P_1$ is displaced downward in a direction of the bottom portion's metal mold 12 along the center axis line $O_1$.

Accordingly, when high-pressure air or the like is blown through the mouth portion 21, the preform 20 in the cavity C is stretched along the direction of the center axis line $O_1$, and the preform 20 is inflated in a radial direction (a direction orthogonal to the center axis line $O_1$). As a result, as illustrated in FIG. 2, the preform 20 is blow molded into the bottle container 30.

The blow molding device 10a according to the present invention may be provided with a resistance applying means (which is not illustrated) that applies resistance to the preform 20 when the support pin $P_1$ is displaced downward. Some examples of the resistance applying means include, for example, a servo motor, a fluid pressure cylinder which may be an air pressure cylinder and an oil pressure cylinder, an elastic member such as a spring, or the like. By thus providing the resistance applying means, even when the stretching rod for stretching the preform 20 is omitted, stretching in the direction of the center axis line $O_1$ and in the radial direction is regulated with the resistance applied by the resistance applying means.

From the state illustrated in FIG. 2, the bottle container 30 undergoes heat treatment operations such as a predetermined heat-set and cooling in the forming molds, and subsequently, undergoes a mold opening process such as a split of the main body's split metal mold 11, and a release process. After that, the bottle container 30 is extracted as a product.

In the present invention, with the concave portion 13c provided in the head 13 of the support pin $P_1$ for receiving the bottom portion 24 of the preform 20, the core misalignment in which, when the preform 20 is stretched, the center position of the preform 20 is displaced in the radial direction is prevented. Furthermore, by providing the head 13 of the support pin $P_1$ with the inclined surface 13f that has an umbrella shape and that flares toward the end, the problem that would occur when the support pin $P_1$ is constituted by using only the shaft 14, that is to say, the problem that the resin of the preform 20 flows around (is caught up on) the side surface of the shaft 14, is prevented.

Moreover, by using the support pin $P_1$ according to the present invention, blow molding is possible even when the stretching rod is omitted. When the stretching rod is used, the blow fluid is fed through the mouth portion 21 of the preform 20 in an area (a differential area between an inner diameter of the mouth portion 21 and an outer diameter of the stretching rod) obtained by deducting a cross section of the stretching rod from an opening area of the mouth portion 21 of the preform 20. On the other hand, when the stretching rod is not used, the blow fluid may be fed in the entire opening area of the mouth portion 21 of the preform 20. Accordingly, a pressure increasing speed is accelerated, and as a result, molding time is reduced. Needless to say, it is possible to adopt the stretching rod in the blow molding device 10a according to the present invention. That is to say, even when the stretching rod is used in the present invention, the aforementioned core misalignment of the preform 20 and the flow-around of the resin are prevented.

According to the present invention, as illustrated in FIG. 3, a maximum diameter of the inclined surface 13f of the head 13 (a maximum diameter of the head 13) $D_{13}$ is preferably greater than a diameter $D_{14}$ of the shaft 14. In the above case, compared with a case where the head 13 is formed to have the same diameter as the shaft 14 or is constituted by using only the shaft 14 and where the concave portion 13c is formed at the tip, the resin of the preform 20 is further prevented from flowing around the side surface of the shaft 14. In the present embodiment, as illustrated in the figure, a maximum edge portion of the inclined surface 13f is configured to have the same size as the lower end 13b of the head 13.

According to the present invention, as in the present embodiment, by forming the upper end 13a of the head 13 as a flat surface to rim the concave portion 13c, the annular flat surface 13a is preferably formed between the concave portion 13c and the inclined surface 13f. In the above case, the head 13 is not provided with any portion that protrudes at an acute angle. Besides, the bottom portion of the container 30 molded by using the head 13 is not provided with any portion that is recessed at an acute angle. Accordingly, by forming the upper end 13a of the head 13 as the flat surface, the bottom portion 24 of the preform 20 smoothly follows an upper surface of the head 13, and a shape of the bottom portion of the container 30 resulted from blow molding is stabilized, and strength of the bottom portion of the container 30 is improved.

Next, with reference to FIG. 4, a description is given of a variety of modifications of the support pin $P_1$.

Figure 4A:
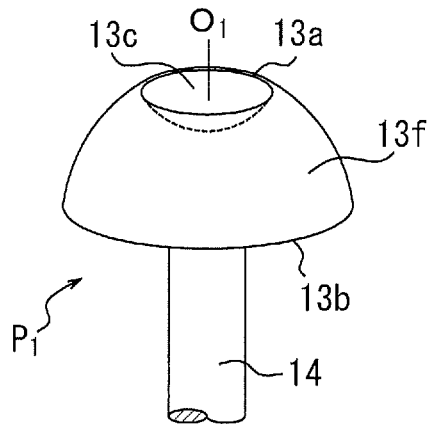
FIGS. 4A-4E are perspective views illustrating various modifications of a support pin according to the first embodiment.
Figure 4B:
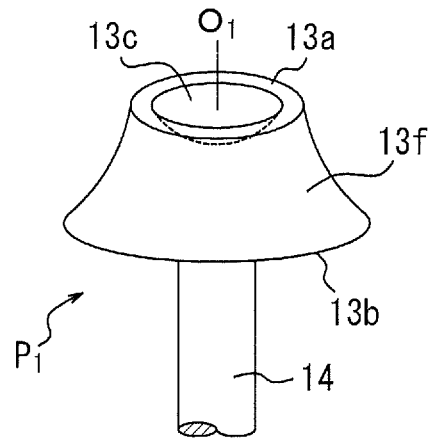

FIG. 4A illustrates the support pin $P_1$ that includes the head 13 having an inverted bowl shape and with the inclined surface 13f that is a curved surface having a curvature whose center is present inward of the head 13. FIG. 4B illustrates the support pin $P_1$ that includes the inclined surface 13f that is a curved surface having a curvature whose center is present outward of the head 13.

Figure 4C:
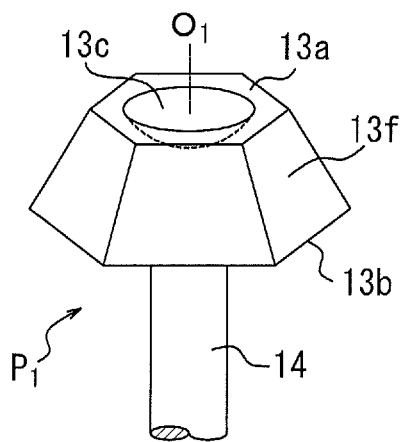
Figure 4D:
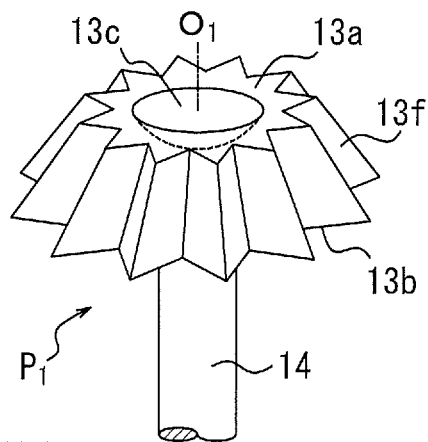

In addition to the conical shape from which a top portion is removed as in the aforementioned examples, the head 13 may also have a pyramidal shape from which a top portion is removed as illustrated in FIG. 4C. Although FIG. 4C illustrates a hexagonal pyramidal shape, the number of side surfaces may be any number. FIG. 4D illustrates the support pin $P_1$ that includes the inclined surface 13f having the shape of a bevel gear.

Figure 4E:
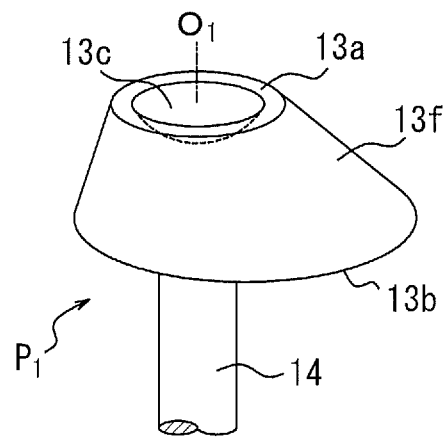

Although in the aforementioned examples the concave portion 13c is formed at the center of the head 13 (in the same axis as the center axis line $O_1$), as illustrated in FIG. 4E, the concave portion 13c may also be formed in a position decentered from the center of the head 13. That is to say, as long as the center axis of the preform 20 is in alignment with the center axis of the concave portion 13c and the shaft 14, it is also possible to provide the inclined surface 13f as illustrated in FIG. 4E in a decentered manner.

Figure 5:
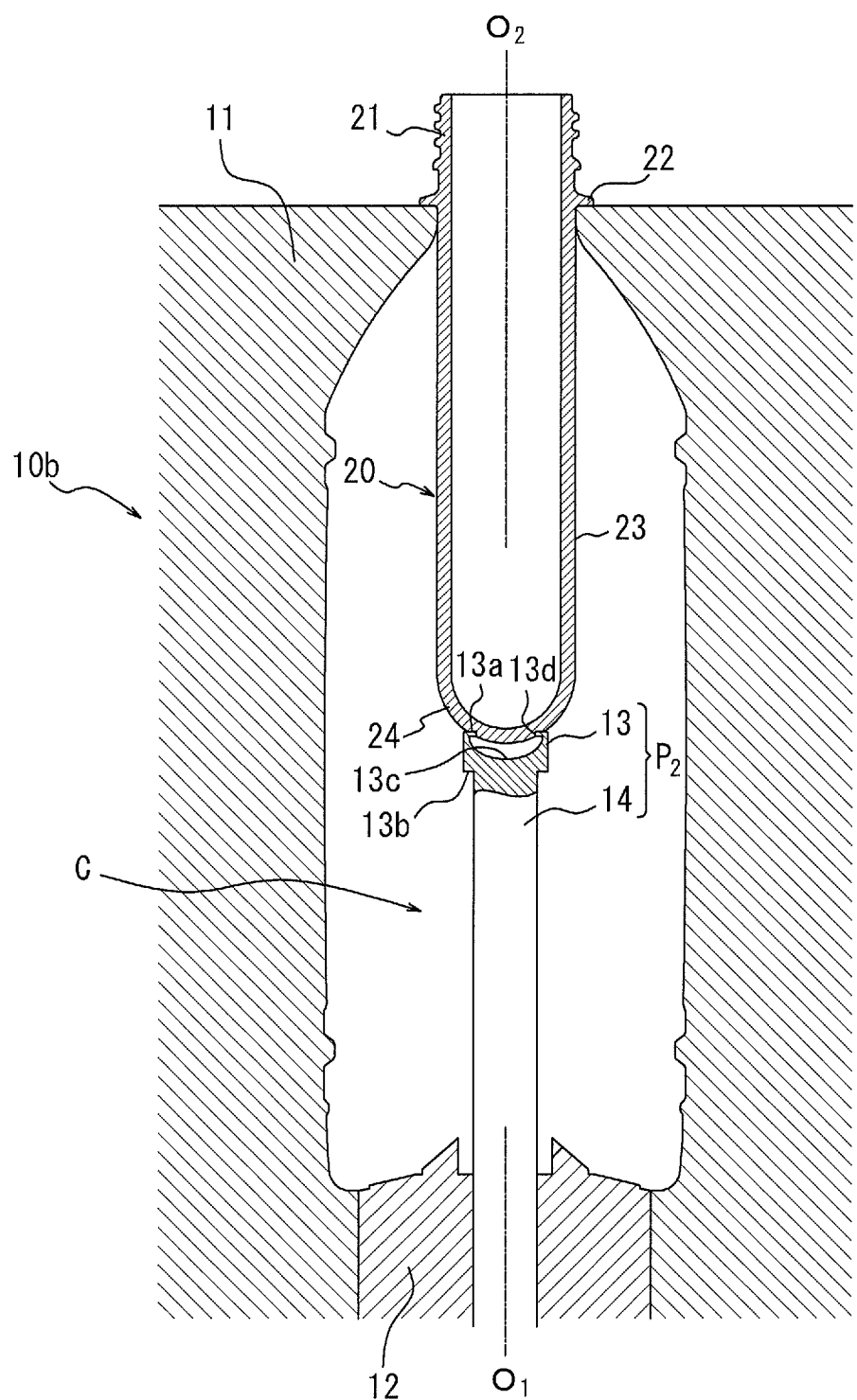
FIG. 5 is a sectional view schematically illustrating a state where a preform is subjected to mold closing in a blow molding device according to another embodiment of the present invention.
Figure 6:
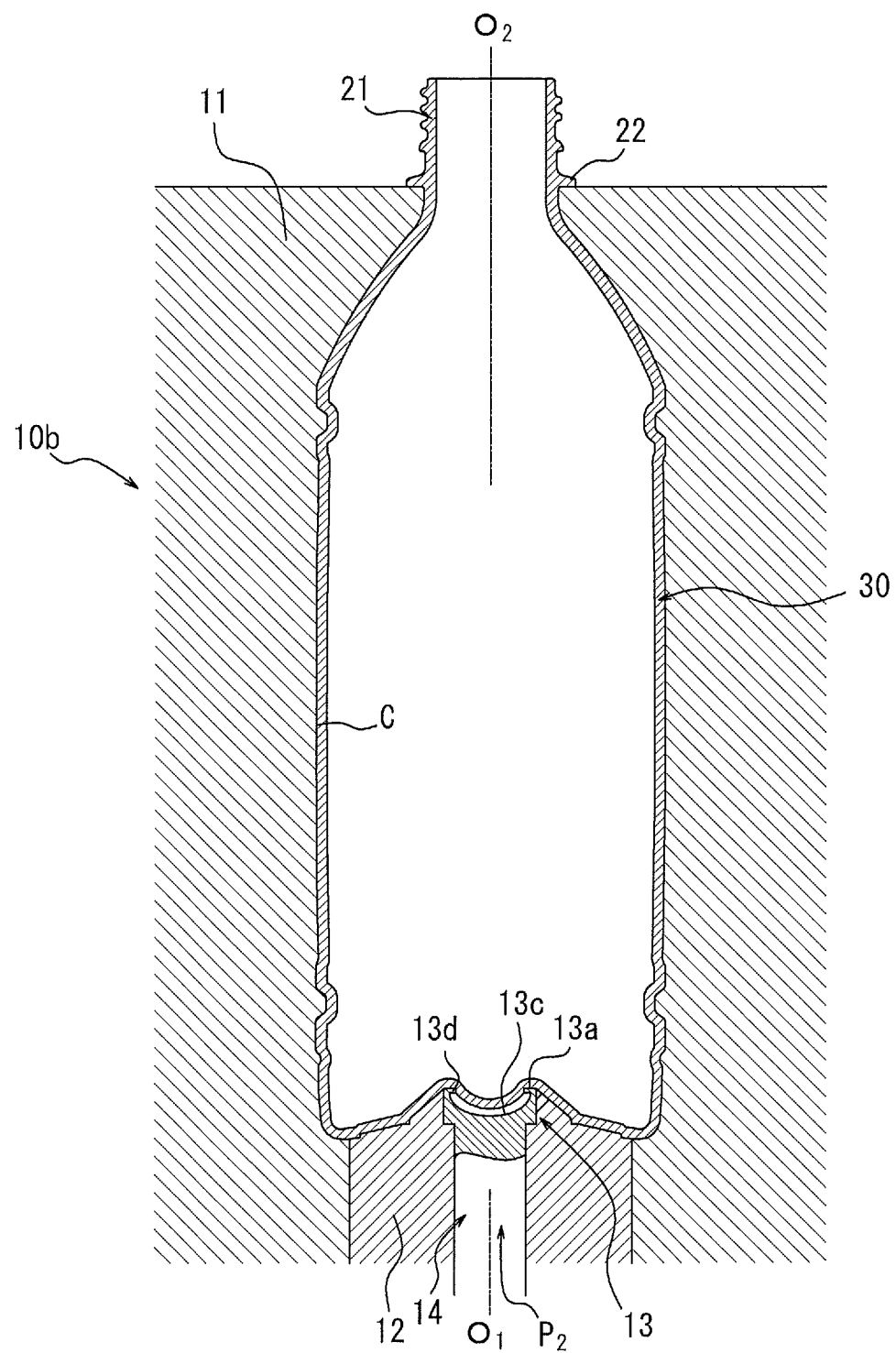
FIG. 6 is a sectional view illustrating a state where blow molding with use of a preform is completed according to the other embodiment.

Next, FIGS. 5 and 6 illustrate another example of a blow molding device according to the present invention. FIG. 5 illustrates the blow molding device 10b according to another embodiment of the present invention in a state where the preform 20 is attached thereto. FIG. 6 illustrates a state where, from the state illustrated in FIG. 5, the bottle container 30 is blow molded.

In a support pin $P_2$ according to the present embodiment, a surface of the concave portion 13c is provided with a protrusion 13d that is oriented from the upper end 13a toward the center axis line $O_1$. The protrusion 13d is formed as a horizontal protrusion extending in the radial direction. The protrusion 13d may be formed in, for example, a polygonal shape, a cylindrical shape, a hemispherical shape, or the like. In particular, when the protrusion 13d is formed in a hemispherical shape, the cross section shape is not limited to a perfect circle and may be an ellipse. The protrusion 13d is configured to be capable of getting into and hooked in the bottom portion 24 of the melted preform 20, and the protrusion 13d is also configured to be relatively easy to remove at the time of pull-out from molds.

Figure 7A:
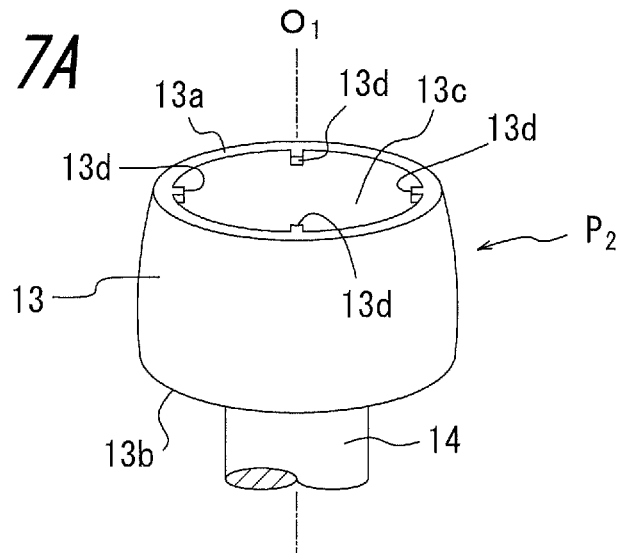
FIG. 7A a perspective view of a part of a support pin according to the other embodiment.

As illustrated in FIG. 7A, the protrusion 13d is provided in plurality, and the plurality of protrusion 13d are arranged at an interval around the center axis line $O_1$. Although in the present embodiment the protrusion 13d is arranged at four positions around the center axis line $O_1$, the number of the protrusions 13d may be increased or decreased. For example, the protrusion 13d may be arranged at three positions. When the plurality of protrusions 13d are provided, these protrusions 13d are preferably arranged at an equal interval around the center axis line $O_1$. However, at least one protrusion 13d may suffice. Accordingly, by forming the protrusion 13d around the entire circumference of the center axis line $O_1$, the protrusion 13d may be formed as a single annular protrusion.

Figure 7B:
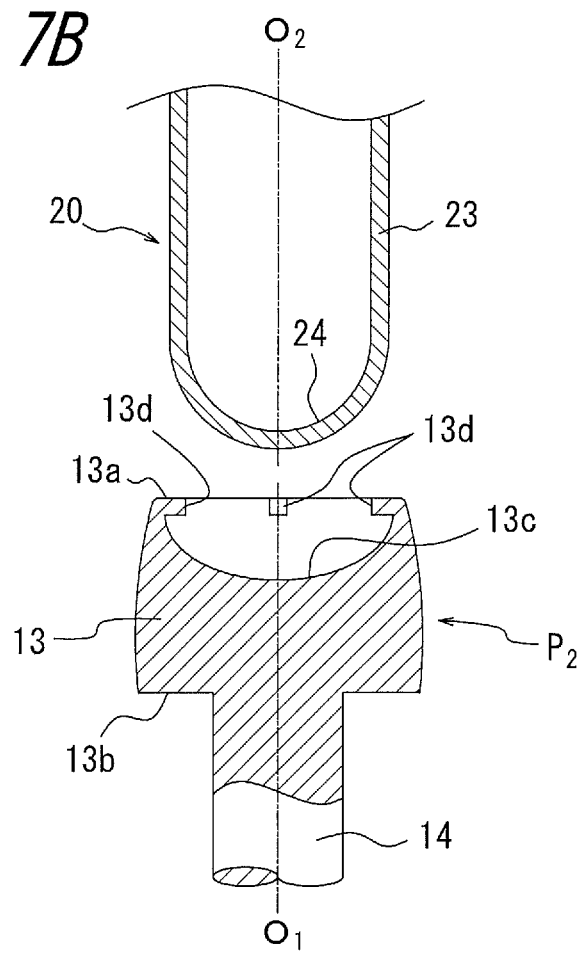
FIG. 7B is an enlarged side view illustrating a part of the support pin along with a preform.

With reference to FIGS. 5-7, a description is given of a method for blow molding the bottle container 30 with use of the blow molding device 10a.

As illustrated in FIG. 5, in the present embodiment, similarly to the first embodiment, the trunk portion 23 of the preform 20 that is subject to mold closing in a metal mold is supported by the support pin $P_2$ that is in an upwardly displaced position. At this time, similarly to the first embodiment, the bottom portion 24 in a melted condition is held by the concave portion 13c and is also engaged with and held by the protrusions 13d provided in the concave portion 13c. Consequently, similarly to the first embodiment, when the blow fluid is blown into the preform 20, the preform 20 in the cavity C is stretched along the direction of the axis line, and the preform 20 is also inflated in the radial direction. As a result, as illustrated in FIG. 6, the preform 20 is blow molded into the bottle container 30.

In the present embodiment, since the protrusions 13d provided in the concave portion 13c get into and hooked in the bottom portion 24 of the melted preform 20, the core misalignment in the cavity C is more effectively prevented. Furthermore, in the present embodiment, the protrusions 13d get into and hooked in the bottom portion 24 of the melted preform 20. Accordingly, the present embodiment is suitable for a case where stretching is performed by means of only the blow fluid without using the stretching rod.

Next, with reference to FIG. 8, a description is given of modifications of the support pin $P_2$.

Figure 8A:
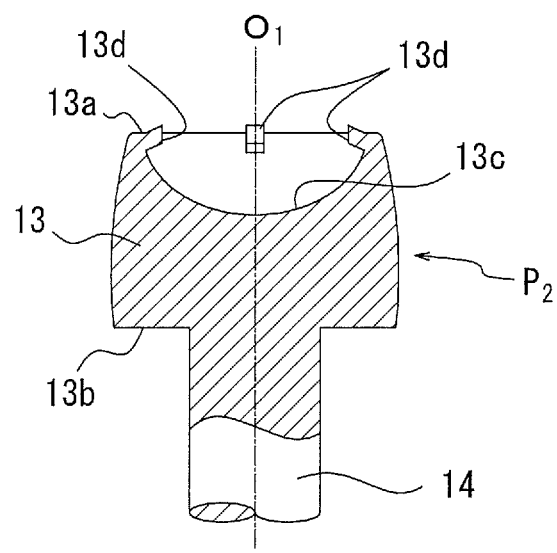
FIGS. 8A and 8B are enlarged side views illustrating partial sections of a variety of modifications of a support pin according to the other embodiment.

FIG. 8A illustrates the support pin $P_2$ with the protrusions 13d that are each formed in the form of an inclined protrusion extending upward toward the center axis line $O_1$. In the embodiment illustrated in FIG. 7, the protrusion 13d is formed in the form of a protrusion extending toward the center axis line $O_1$ in the radial direction, and by doing so, resultant force (hooking force) with respect to the bottom portion 24 is improved. On the other hand, the protrusion 13d of the present embodiment is capable of holding the bottom portion 24 with an appropriate engagement force and also capable of allowing a smooth pull-out from molds.

Figure 8B:
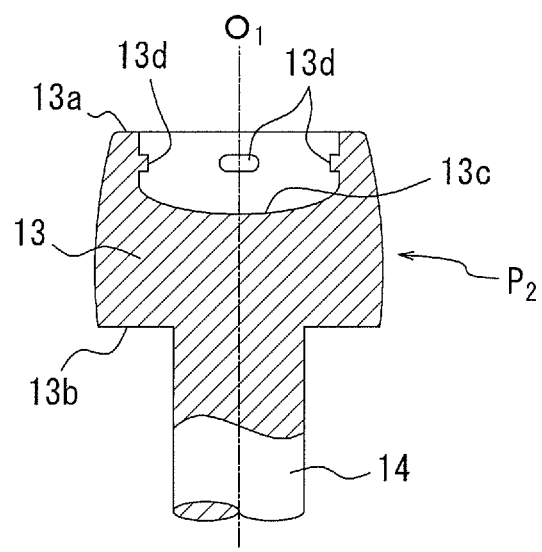

FIG. 8B illustrates the support pin $P_2$ with the protrusions 13d that are each formed in the form of a protrusion extending toward the center axis line $O_1$ in the radial direction and that is provided on a further back side (a bottom side) of the concave portion 13c than the upper end 13a. As illustrated by the protrusion 13d arranged in the front of the figure, the protrusion 13d according to the present embodiment is formed in a hemispherical shape extending in an elliptical shape in a circumferential direction.

Figure 9A:
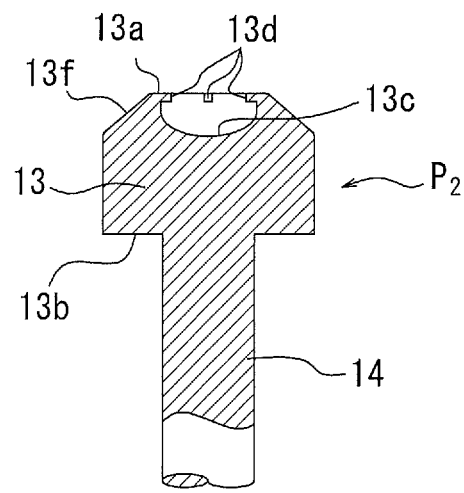
FIGS. 9A and 9B are enlarged side views illustrating partial sections of yet another variety of modifications of a support pin according to the other embodiment.
Figure 9B:
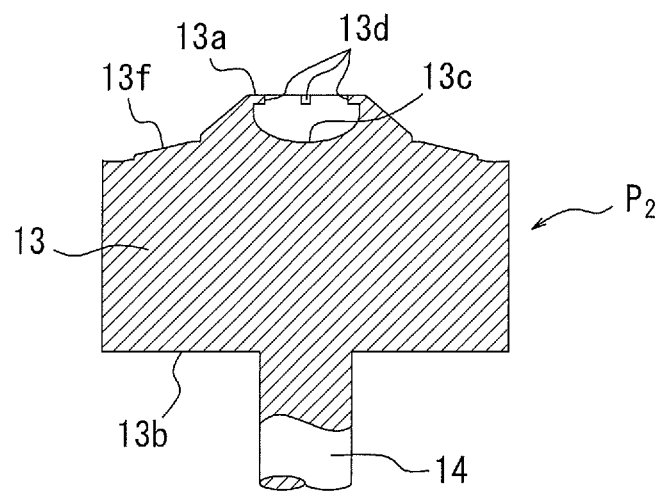

FIGS. 9A and 9B illustrate yet another variety of modifications of the support pin $P_2$.

FIG. 9A illustrates, as a modification of the support pin $P_2$ provided with the protrusion 13d according to the embodiment illustrated in FIG. 7, the support pin $P_2$ including the head 13 in which the inclined surface 13f similar to that in the first embodiment is formed radially outward of the concave portion 13c. In FIG. 9B, the head 13 is formed as a metal mold that forms the entire bottom portion of the bottle container 30. In the above case, it is ensured that the resin of the preform 20 is prevented from flowing around (being caught up on) the side surface of the shaft 14.

Although various embodiments of the present invention have been described on the above, according to the present invention, a variety of changes are possible. For example, the shape of the surface of the concave portion 13c may be changed to any one of different shapes such as a hemispherical shape, a cylindrical shape, a shape combining these, or the like. The opening portion of the concave portion 13c is not limited to a circular shape and may be a polygonal shape.

Additionally, both the support pins $P_1$ and $P_2$ may be removed from the bottom portion's metal mold 12 together with the shaft 14 in accordance with the shape of the bottom portion of the bottle container 30, for the purpose of replacement. Furthermore, although in the above embodiments the head 13 and the shaft 14 are described to be integrally formed, the head 13 and the shaft 14 may be formed separately. In the above case, in accordance with the shape of the bottom portion of the bottle container 30, only the head 13 may be replaced.

Furthermore, the main body's split metal mold 11 and the bottom portion's metal mold 12 that are illustrated are merely examples, and other structures may also be possible. For example, the main body's split metal mold 11 and the bottom portion's metal mold 12 may be integrated. For example, the container is not limited to a bottle container as long as the container may be blow molded. In addition, each of the structures and steps (method) adopted in the embodiments and the modifications may be replaced by or combined with another embodiment or modification as appropriate.

INDUSTRIAL APPLICABILITY

The present invention may be adopted in a variety of blow molding devices and blow molding methods as long as the devices and the methods are capable of blow molding a preform formed in a bottomed tubular shape in a mold to obtain a molded container.

REFERENCE SIGNS 10a blow molding device (in the first embodiment)
10b blow molding device (in the second embodiment)
11 main body's split metal mold
12 bottom portion's metal mold
13 head
13a upper end of head (flat surface)
13b lower end of head
13c concave portion
13d protrusion
13f inclined surface
14 shaft
20 preform
21 mouth portion
22 neck ring
23 trunk portion
24 bottom portion
30 bottle container
$P_1$ support pin
$P_2$ support pin

The invention claimed is:

1. A blow molding device that blow molds a preform into a container in a forming mold, the preform having a bottomed tubular shape, the blow molding device comprising:
    a support pin that is disposed in the forming mold, wherein
    the support pin includes a head that supports a bottom portion of the preform, and a shaft that is connected to the head and that is displaceable upward and downward in an axis direction of the preform, and
    the head provided, at one end thereof supporting the bottom portion of the preform, with a rounded concave portion corresponding to and receiving at least a part of the bottom portion of the preform in a constrained engagement whereby core misalignment of the preform is prevented.

2. The blow molding device of claim 1, wherein the head includes an inclined surface formed outward of the rounded concave portion, the inclined surface flaring toward another end of the head.

3. The blow molding device of claim 1, wherein a maximum diameter of the head is greater than a diameter of the shaft.

4. The blow molding device of claim 1, wherein the one end of the head is formed as a flat surface.

5. The blow molding device of claim 1, wherein the support pin is configured to support the bottom portion of the preform in an upwardly displaced position of the support pin and is configured to be displaced downward in accordance with deformation of the preform as a result of blow molding.

6. The blow molding device of claim 1, comprising a resistance applying means that applies resistance to the preform when the support pin is displaced downward.

7. The blow molding device of claim 1, wherein the rounded concave portion has a surface that is provided with a protrusion oriented toward a center axis line of the support pin.

8. The blow molding device of claim 7, wherein the protrusion extends upward toward the center axis line.

9. The blow molding device of claim 7, wherein the protrusion extends in a radial direction.

10. The blow molding device of claim 7, wherein the protrusion is provided in plurality, the plurality of protrusions being arranged at an interval around the center axis line.

11. A blow molding method for blow molding a preform into a container in a forming mold, the preform having a bottomed tubular shape, the blow molding method comprising the steps of:
    disposing a support pin in the forming mold, the support pin being displaceable upward and downward in an axis direction of the preform;
    receiving at least a part of a bottom portion of the preform in a rounded concave portion corresponding to the part of the bottom of the preform and that is provided at one end of a head of the support pin, the receiving of the bottom portion of the preform being a constrained engagement whereby core misalignment of the preform is prevented; and
    supporting the bottom portion of the preform in a upwardly displaced position of the support pin and displacing the support pin downward in accordance with deformation of the preform as a result of blow molding.

12. The blow molding method of claim 11, wherein the head of the support pin includes an inclined surface formed outward of the rounded concave portion, the inclined surface flaring toward another end of the head.

13. The blow molding method of claim 11, wherein a maximum diameter of the head of the support pin is greater than a diameter of a shaft that is connected to the head.

14. The blow molding method of claim 11, wherein the one end of the head of the support pin is formed as a flat surface.

15. The blow molding method of claim 11, wherein the rounded concave portion provided in the support pin has a surface that is provided with a protrusion oriented toward a center axis line of the support pin.

16. The blow molding method of claim 15, wherein the protrusion extends upward toward the center axis line.

17. The blow molding method of claim 15, wherein the protrusion extends in a radial direction.

18. The blow molding method of claim 11, further comprising the step of:
    displacing the support pin downward while resistance is applied to the preform during blow molding.

* * * * *